(12) United States Patent
Davies et al.

(10) Patent No.: US 6,249,352 B1
(45) Date of Patent: Jun. 19, 2001

(54) LATERAL SHEARING INTERFEROMETER SYSTEM WITH MASKED INTERFERENCE PATTERN

(75) Inventors: Donald W. Davies, Torrance; Mark Slater, Manhattan Beach; Richard A. Hutchin, Calabasas, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/410,011

(22) Filed: Sep. 30, 1999

(51) Int. Cl.[7] .................................................. G01B 9/02
(52) U.S. Cl. ............................................ 356/512; 356/520
(58) Field of Search ................................... 356/520, 512, 356/495, 489, 521

(56) References Cited

U.S. PATENT DOCUMENTS 4,692,027 * 9/1987 MacGovern et al. ................. 356/520

OTHER PUBLICATIONS

"Optical Shop Testing", Chapter 4, Second Edition, Edited by Daniel Malacara, 1992.

* cited by examiner

Primary Examiner—Samuel A. Turner
(74) Attorney, Agent, or Firm—Robert W. Keller

(57) ABSTRACT

An improved lateral shearing interferometer system for use with an original optical wavefront and a displaced optical wavefront having a phase difference from the original optical wavefront is disclosed. It comprises a lateral shearing interferometer that responds to the original optical wavefront and the displaced optical wavefront and develops an optical interference pattern representative of the optical phase differences. An optical detector located at the focal plane of the optical interference pattern provides a selective array of electrical signals representative of separated portions of the interference pattern. A data processor is programmed to indicate the separated portions of said interference pattern, which has pixels in non-adjacent locations in odd rows and no pixels in even rows. The pixels correspond to locations of actuators for correcting the phase difference.

9 Claims, 2 Drawing Sheets

LATERAL SHEARING INTERFEROMETER SYSTEM WITH MASKED INTERFERENCE PATTERN

CROSS-REFERENCE TO RELATED APPLICATION

The present application is related to pending U.S. patent application Ser. No. 09/257,162, filed Feb. 24, 1999, entitled: "Dual Sensor Atmospheric Correction System" by Donald W. Davies, Mark Slater, and Richard A. Hutchin, assigned to the same assignee as this present invention, and its contents are incorporated herein by reference.

This invention was made with Government support. The Government has certain rights in this invention as specified in FAR 52.227-12.

BACKGROUND OF THE INVENTION

Field of the Invention

The present invention relates generally to a lateral shearing interferometer system, and more particularly to a lateral shearing interferometer system that utilizes selected non-adjacent portions of the interference pattern to provide an accurate measurement of the phase difference between two optical wavefronts.

DESCRIPTION OF THE PRIOR ART

Lateral shearing interferometers (LSIs) are employed as wavefront sensors and are extremely well known in the art. LSIs are disclosed, for example, in "Optical Shop Testing", Second Edition, edited by Daniel Malacara, John Wiley and Sons, Inc., 1992, Chapter 4, entitled: "Lateral Shearing Interferometers" by M. V. Mantravadi, which chapter is hereby incorporated by reference.

In one use of unit shear LSI wavefront sensors, a copy of the wavefront is normally made and shifted in the X-direction by a distance equal to the spacing between actuators on a deformable mirror. The original and shifted beams are interfered in order to find the phase difference therebetween. The interference pattern is applied to an array of detectors. The intensity of the light in the entire interference pattern provides a measure of the wavefront X-tilt. This is also done with a shear in the Y-direction to get the Y-tilt. The output signals from the detectors are processed to provide tilt signals which, in turn, are applied to a plurality of actuators of a deformable mirror to correct for any distortions sensed in the wavefront.

As described in the related U.S. patent application Ser. No. 09/257,162 output signals from the LSI and from a Hartman wavefront sensor are known to be processed by a so-called real reconstructor which provides relatively accurate results between conditions in which the wavefront phase change between adjacent subapertures is $\pi$ radians or less. As is well known, wavefront sensors processed by real reconstructors, are blind to branch point discontinuities in the wavefront. Consequently, the wavefront sensors are known to provide rather poor results when large wavefront phase changes rapidly occur. Hence the system described in the related patent application utilizes a complex reconstructor that uses the entire light in the interference pattern to process the optical output signals from the unit shear LSI wavefront sensor to provide relatively accurate estimates of the tilt signals at the discontinuities.

An example of a prior art lateral shearing interferometer is illustrated in FIG. 1 and designated as 10. The LSI employs a Mach-Zehnder interferometer including an input beam splitter 12, and output beam combiner 14, and two plane reflectors 16 and 18 arranged in two beam paths. Two identical glass plane parallel plates 20 and 22 of the same thickness and material are employed in each beam path of the LSI. The two plates are arranged and adjusted in such a way that they rotate in equal amounts as shown in FIG. 1. When a wavefront 23 from a convergent beam of light is incident on the beam splitter 12, the beam splitter 12 separates the beam into two paths and through the two identical rotating glass plates 20 and 22 to obtain lateral shear at the output of the LSI as indicated at 24. To determine tilt or displacement between two successive incident beams, or wavefronts, and with reference to FIG. 2, in operation, the LSI 10 takes a portion of a first beam 26 and a portion of a successive beam 28 and interferes them over the entire area. This results in the interfered pattern 30 in which the portions 26 and 28 are in the same spatial location. It should be recognized that the output 24 of the LSI is the integral of the interference of the entire area from the two incident wavefronts. If the interfered patterns are in-phase the pixel 30 is very bright. If the interfered patterns are out of phase then no light is present at the pixel 30. As shown, since the entire light in the interfered pattern is used, the pixel 30 fills its entire area.

What is wanted for the reconstruction of the wavefront is the phase difference between the points where the actuators are located. When interfering an extended region, as is usually done, the LSI produces an output that depends on the integral of the sine of the phase difference, not the phase difference itself. When the phase variations are small this does not produce a large error, however when the phase is varying rapidly the output of the LSI sensor is innacurate.

What is needed, therefore, is an improved LSI system that provides substantially enhanced performance, and one which produces more accurate phase difference measurements between incident wavefronts, even when the phase difference varies rapidly.

SUMMARY OF THE INVENTION

The preceding and other shortcomings of the prior art are addressed and overcome by the present invention which provides, in a first aspect an improved lateral shearing interferometer system for use with an original optical wavefront and a displaced optical wavefront having a phase difference from the original optical wavefront that utilizes only selected portions of the interfered light to achieve more accurate results. The LSI system comprises a lateral shearing interferometer for developing an optical interference pattern representative of the optical phase difference between the original and displaced wavefronts. An optical detector positioned at the focal plane develops an array of electrical signals representative of the interference pattern. A data processor is programmed to utilize only spatially separated electrical signals from the array, which thus represents separated portions of the interference pattern. This effectively uses approximately one-quarter of the area of the interfered light and essentially can be considered to function as an array of separated small light sources.

In another implementation, the present invention provides an improved lateral shearing interferometer that employs a mask over the focal plane optical detector with openings therethrough at preselected locations and creates an interfered pattern that comprises an array of non-adjacent regions. The optical detector senses these regions and provides an array of electrical signals representative of the phase differences in the incident wavefront. A data processor responds to the electrical signals and provides an indication of the resulting interfered pattern. This also uses approximately one-quarter of the area of the interfered light.

The foregoing and additional features and advantages of this invention will become apparent from the detailed description and accompanying drawing figures below. In the figures and the written description, numerals indicate the various elements of the invention. Like numerals refer to like elements throughout both the drawing figures and the written description.

DETAILED DESCRIPTION OF THE PREFERRED EMBODIMENTS

Figure 1:
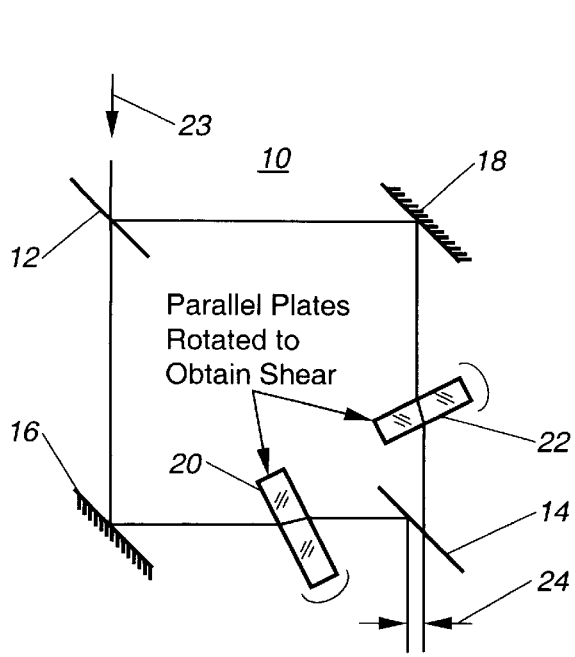
FIG. 1 is a schematic diagram of a lateral shearing interferometer of the prior art.
Figure 2:
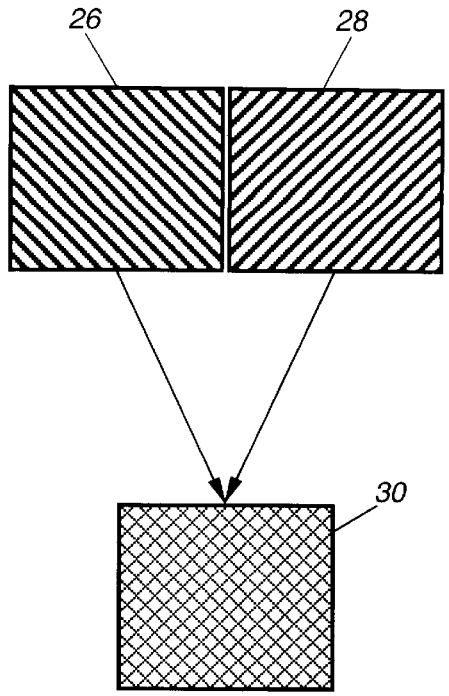
FIG. 2 depicts the incident wavefronts and the interfered output of the LSI of FIG. 1.
Figure 3:
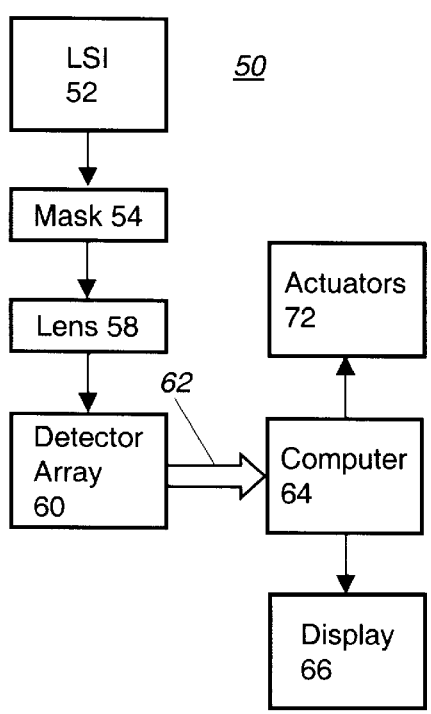
FIG. 3 is a schematic diagram of the improved LSI in accordance with the present invention.

As illustrated in FIG. 3, the present invention provides an improved LSI system, generally indicated by the numeral 50, in accordance with the present invention. The system 50 comprises a lateral shearing interferometer 52 that responds to an original optical wavefront and a displaced optical wavefront having a phase difference from the original optical wavefront and may be of the type illustrated in FIG. 1. As is well known the LSI 52 develops an optical interference pattern representative of the optical phase differences over the entire wavefront.

Figure 4:
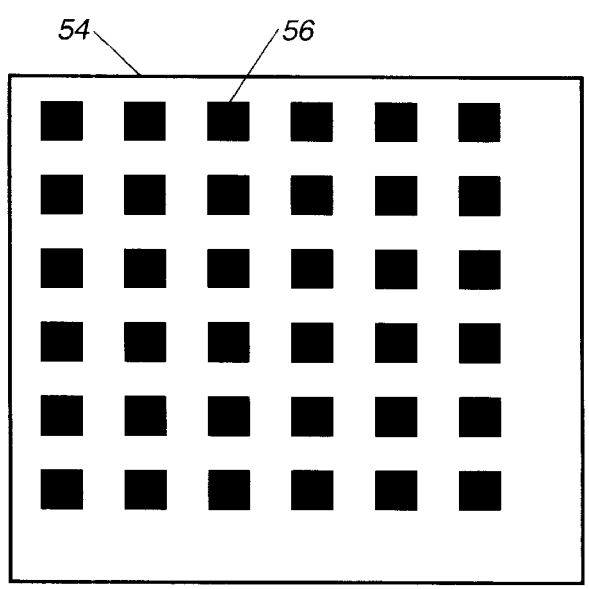
FIG. 4 is a diagram of the mask shown in FIG. 3

A mask 54 is positioned at the focal plane of the optical interference pattern. Referring also to FIG. 4, the mask 54 comprises an array of openings 56 to allow only non-adjacent portions of the interfered light to an imaging lens 58. The openings 56 serve to restrict the sensed area. In the example there are 36 identically-sized openings arranged in a square 6×6 matrix, although any number of openings may be used to practice the invention. The opening 56 occupies an area approximating one-quarter of a square before encountering the adjacent opening in a horizontal or vertical direction with reference to the orientation of the mask shown in FIG. 4. The imaging lens 58 images the parallel beam of interfered light onto a focal plane detector array 60. For LSI systems 50 that operate on visible light, the detector array 60 is preferably a charge coupled device (CCD) without a lens. Alternatively, for systems operating on infrared light, for example, at a wavelength of 1.55 microns, the detector array could be an infrared focal plane. In any event, the detector array 60 consists of a grid of individual sensor elements or pixels that each output an electrical signal 62 in response to the light incident thereon. Electrical signals 62 generated by the array 60 are output to a computer or special purpose data processor 64 having a memory and a display screen 66.

Figure 5:
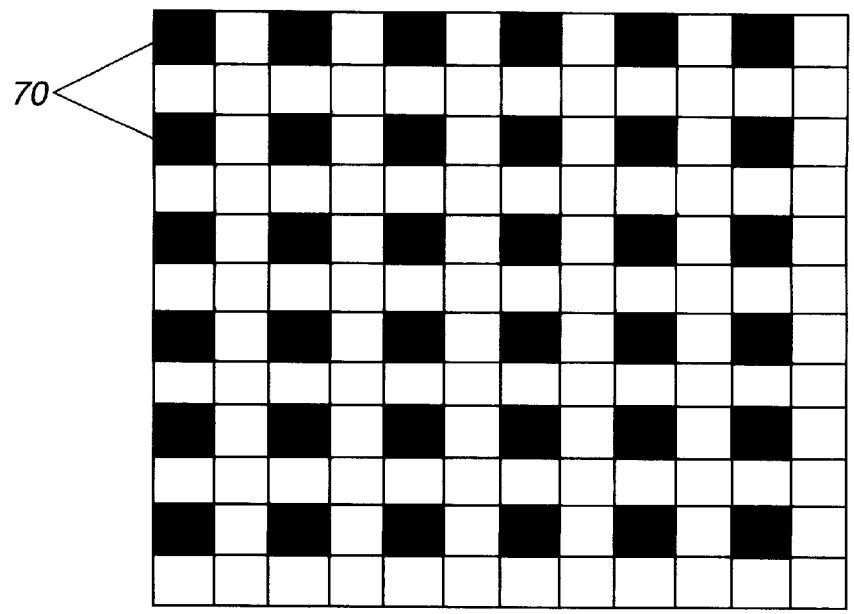
FIG. 5 depicts the effective interfered outputs of the LSI of FIG. 3 showing the use of a portion of the interfered light.

Referring to FIG. 5, the electrical signals 62 generated by the array 60 and displayed on the screen 66 will now be described. As shown in FIG. 4, images 70 generated by the detector array 60 are shown. The images correspond to the intensity of the pixel formed by the interfered original optical wavefront and the displaced optical wavefront for each small segment in the pattern. In fact each pixel corresponds to the intensity of the light flowing through a corresponding opening 56 in the mask 54, and hence corresponds to the measurement of the tilt at that location of the interfered pattern. In FIG. 5, the pixels are arranged in a pattern, each being spaced apart from its horizontal neighbor in an odd row and with no pixels being illuminated in even rows. The computer 64 is programmed to read out the information contained in the pixels. As shown in FIG. 4, only about one-quarter of the interfered light is utilized in the system. It has been discovered that this results in a more accurate measurement of displacement, especially when a sufficient amount of light is available.

In application, the array of pixels correspond to and are above an array of actuators denoted generally by the numeral 72, on a deformable mirror. The actuator can move the corresponding mirror segment up, typically a distance of about one micron, or a fraction of the wavelength of the light used in the system. Accordingly, the system is able to correct for distortions sensed in the incident wavefront.

Figure 6:
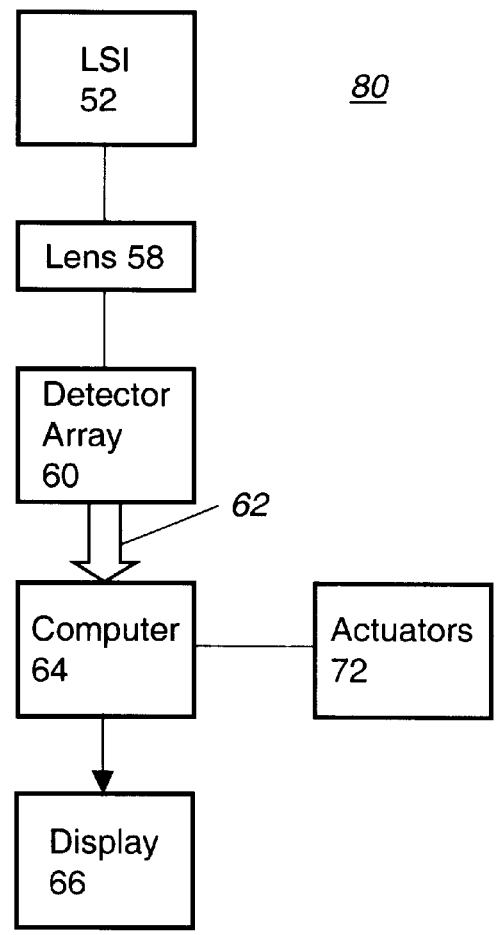
FIG. 6 is a schematic diagram of an alternative embodiment of the improved LSI in accordance with the present invention.

Referring now to FIG. 6, an alternative embodiment of the improved lateral shearing interferometer system 80 is illustrated. The system 80 differs from the LSI system 50 shown in FIG. 3 in that it does not employ a mask covering the focal plane detector array 60. Consequently, the entire interfered pattern is sensed by the detector array 60. In this embodiment, the memory of the computer 64 is programmed to ignore certain pixels. Preferably, the program uses spaced-apart pixels from an odd numbered row and does not use pixels comprising the subjacent row. Effectively this results in using about one-quarter of the interfered light, as was previously described.

It should be recognized that fractions of light other than one-quarter and detector arrays with more finely-divided focal planes can also be utilized in the present invention. In fact, smaller portions of light more closely simulate point sources of interfered light. It should also be recognized that in the extreme point sources of light would have no measurable signal and thus could not be employed in the present invention.

Obviously, many modification and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. An improved lateral shearing interferometer system for use with an original optical wavefront and a displaced optical wavefront having a phase difference from the original optical wavefront, comprising:

a lateral shearing interferometer responsive to the original optical wavefront and the displaced optical wavefront and operative to develop an optical interference pattern representative of the optical phase differences; and means responsive to said optical interference pattern and operative to provide a selective array of electrical signals representative of separated portions of the interference pattern, wherein the indication of separated portions has a pattern of pixels in non-adjacent locations in odd rows and without pixels in even rows.

2. The improved lateral shearing interferometer system as set forth in claim 1, wherein the pattern represents pixels corresponding to actuators for correcting the phase difference.

3. The improved lateral shearing interferometer system as set forth in claim 1, wherein said means responsive to said optical interference pattern comprises means for masking said optical interference pattern to provide an array of non-adjacent interfered patterns, an optical detector for sensing the spaced-apart interfered patterns and for providing an array of electrical signals representative of said phase differences, and data processing means responsive to said array of electrical signals and operative to provide an indication of separated portions of said interference pattern.

4. The improved lateral shearing interferometer system as set forth in claim 3, wherein said optical detector is located at the focal plane associated with said optical interference pattern.

5. The improved lateral shearing interferometer system as set forth in claim 3, and further comprising lens means disposed between said means for masking and said optical detector for focusing said array of non-adjacent interfered patterns.

6. The improved lateral shearing interferometer system as set forth in claim 4, wherein said indication of separated portions of said interference pattern has pixels in non-adjacent locations in odd rows and no pixels in even rows.

7. The improved lateral shearing interferometer system as set forth in claim 6, wherein the pixels correspond to locations of actuators for correcting the phase difference.

8. The improved lateral shearing interferometer system as set forth in claim 3, wherein said data processing means comprises a special purpose processor.

9. An improved lateral shearing interferometer system for use with an original optical wavefront and a displaced optical wavefront having a phase difference from the original optical wavefront, comprising:

a lateral shearing interferometer responsive to the original optical wavefront and the displaced optical wavefront and operative to develop an optical interference pattern representative of the optical phase differences;

means for selectively masking said optical interference pattern to as to provide an array of spaced-apart interfered patterns;

an optical detector responsive to said array of non-adjacent interfered patterns and operative to provide an array of electrical signals representative of said phase difference; and data processing means responsive to said array of electrical signals and operative to provide an indication of separated portions of the interference pattern.

* * * * *